United States Patent [19]

Goto

[11] 3,999,200
[45] Dec. 21, 1976

[54] FILM PACK WITH LIGHT SHIELDING MEANS

[75] Inventor: Toshio Goto, Omiya, Japan

[73] Assignee: Fuji Photo Film Co., Ltd., Minami-ashigara, Japan

[22] Filed: May 8, 1975

[21] Appl. No.: 575,860

[30] Foreign Application Priority Data

May 11, 1974 Japan .............................. 49-52468

[52] U.S. Cl. .............................................. 354/277
[51] Int. Cl.² ...................................... G03B 17/26
[58] Field of Search ............. 354/85, 86, 174, 178, 354/275, 276, 277; 96/76 C, 201; 352/75

[56] References Cited

UNITED STATES PATENTS

| | | | |
|---|---|---|---|
| 3,872,487 | 3/1975 | Gold | 354/178 |
| 3,922,700 | 11/1975 | Asano et al. | 354/174 |
| 3,930,264 | 12/1975 | Asano | 354/174 |

Primary Examiner—L. T. Hix
Assistant Examiner—Alan Mathews
Attorney, Agent, or Firm—Sughrue, Rothwell, Mion, Zinn & Macpeak

[57] ABSTRACT

A film pack having light shielding means for use in a camera employing individual film units, which light shielding means includes a pair of guide means provided on side walls of the film pack, while one surface of the film pack formed with a discharge outlet for the film units is located between the side walls, so that the light shielding and stopper member of the light shielding means for shielding the discharge outlet can be guided along the guide means so as to close or open the discharge outlet. The light shielding means further includes a light shielding plate member of resilient material held between the discharge outlet and the light shielding and stopper member for perfect shielding of outside light, which shielding plate member is adapted, by its own resilience, to allow the film unit to pass therethrough when released from the light shielding and stopper member.

5 Claims, 5 Drawing Figures

FILM PACK WITH LIGHT SHIELDING MEANS

BACKGROUND OF THE INVENTION

1. Field of the Invention

The present invention relates to a film pack and more particularly, to a film pack having light shielding means for use in association with a camera employing film in the form of individual film units.

2. Description of the Prior Art

There is known a photographic process, frequently referred to as 'auto-process', according to which film is provided not in roll form but in the form of individual units each of which comprises at least a negative image layer and a transfer image layer and has associated therewith processing solution contained in breakable pods, which are usually embedded in an edge portion of the film unit. The negative image layer is exposable to form a negative or latent image of an object, and a corresponding, a viewable image may be formed on the transfer image layer under the influence of the processing solution, which is extruded from the pods and spread through the film unit under the action of pressure means between which the film unit is passed subsequent to exposure, which are conveniently provided as processing rolls, for example, mounted inside the associated auto-process camera, and which also act to move film unit to the exterior of the camera, whereby a finished photographic print may be available to a photographer in a very short time after a film unit is exposed, without it being necessary for the photographer to proceed to a separate, specially equipped location for development and processing of film. An auto-process camera must therefore include a film pack for positioning successive film units at an exposure station, processing rolls or other pressure means for processing exposed film units and moving the film units to the exterior of the camera, and means for forwarding successive film unit from the exposure station to the processing rolls.

Conventionally, such a film pack accommodating the film units therein and releasably attached to the camera body is of a rectangular or square box-like configuration, which film pack must be of light shielding construction, especially at a discharge outlet thereof for delivering the exposed film units out onto the pressure rolls. In other words, the film pack of the above described type should be so constructed that the same is able to shield the film units therein against any outside light prior to attachment of the pack to the camera body and that shielding for an exposure opening and the discharge outlet formed in the pack be released when the pack is mounted in the camera ready for shooting.

Commonly, in the auto-process camera of mirror image type employing the film units of known structure, a light shielding stopper plate is provided at the discharge outlet of the film pack, which stopper plate is adapted to be forcibly opened when the film pack containing the film units therein is attached to the camera body. The conventional film pack of the above described type, however, has such a serious disadvantage that, although light is shielded by a light shielding plate or the like even when the stopper plate is released, there still remains danger of light leakage which may expose part of the film units held in the pack to unnecessary light.

In order to overcome such disadvantages, a light shielding stopper releasing means entitled "A camera having light shielding stopper releasing means for a film pack" was proposed by the Japanese patent application Ser. No. 49-40570, filed on Apr. 9, 1974 by the same assignee, in which application, there is disclosed a light shielding stopper releasing means wherein a light shielding stopper plate for the film unit is provided with projections or bent portions extending outwardly at right angles from the opposite side walls of said stopper palte, which projections are adapted to engage a lever member pivotally mounted on the rear cover plate of the camera, or the camera body and after the film pack with film units accommodated therein has been mounted in the camera body with the rear cover plate of the camera closed, the lever is actuated, by an associated slidable knob provided on the rear cover plate of the camera, for engagement with the projections of the stopper plate and consequently for partially raising the stopper plate so as to open the discharge outlet which is communicated with a corresponding slot formed in the camera body for discharging exposed film units out of the camera through pressing rolls. In this arrangement, the film pack loaded within the camera body is perfectly shielded against outside light prior to actuation of the lever except for exposure during shooting.

Accordingly, an essential object of the present invention is to provide a film pack having light shielding means for use in an auto-process camera which corresponds the technical concept of the light shielding stopper releasing means disclosed in the above Japanese patent application Ser. No. 49-40570, and in which a discharge outlet of a film pack is perfectly covered and shielded against light upon loading the film pack within the camera, while the shielding is readily released by the actuation of releasing means from outside of the camera with substantial elimination of the disadvantages inherent in the conventional film pack.

Another important object of the present invention is to provide a film pack of the above described type which is accurate in functioning and can be readily mounted in the auto-process camera.

A further object of the present invention is to provide a film pack of the above described type which is simple in construction and can be manufactured at low cost.

SUMMARY OF THE INVENTION

According to a preferred embodiment of the present invention, the film pack of generally rectangular box-like configuration is preferably made of plastic material or the like, and comprises a front wall in which a discharge outlet for film units or a slit is formed, side walls, a rear wall, a bottom wall and an upper opening surrounded by a frame. On each of the opposite side walls, in a position adjacent to the edges where the front wall meets the side walls, guide means are provided for engaging a light shielding stopper member so as to entirely cover and shield the discharge outlet against light, which light shielding stopper member is adapted to be displaceable along the guide means. After the film pack has been loaded within the camera with the former completely shielded against outside, the light shielding stopper member is displaced through actuating means from outside of the camera for releasing the covering and shielding of the discharge outlet.

It should be noted here that although film packs of various constructions are proposed depending on the types of the film units to be accommodated in the film pack, the present invention is not related to the internal structures of such film packs, but directly related to the light shielding means to be incorporated therein.

It should also be noted that the light shielding stopper releasing means as disclosed in the Japanese patent application Ser. No. 49-40570 described earlier is also applicable to the film pack of the invention and that, in a preferred embodiment of the present invention, a pair of projections are provided on the light shielding stopper member for engaging the releasing means for displacing said stopper member.

These and other objects and features of the present invention will become apparent from the following description taken in conjunction with the preferred embodiment thereof with reference to the accompanying drawings.

DESCRIPTION OF A PREFERRED EMBODIMENT

Figure 1:
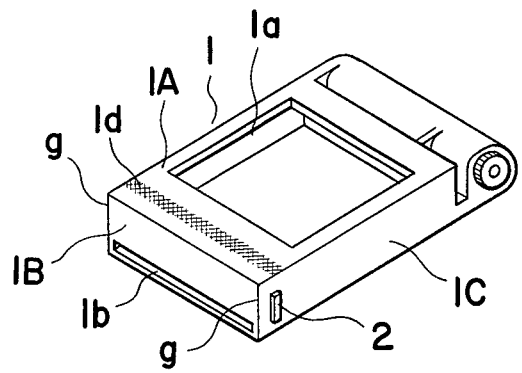
FIG. 1 is a perspective view of a film pack which may be employed in the present invention.

Before the description of the present invention proceeds, it should be noted that like parts are designated by like reference numerals throughout several views of the accompanying drawings.

Referring to FIG. 1, there is shown a film pack 1 for better understanding of the appearance of such a film unit, although internal construction thereof is not directly related to the present invention and description thereof is abbreviated for brevity. The details of the film pack which may be employed in the present invention are disclosed in the U.S. patent application Ser. No. 527,779, filed on Nov. 27, 1974 and assigned to the same assignee. Alternatively, the pack to which the present invention can be applied may be of any known, currently commercially available film pack. It is to be noted that the film pack 1 shown in FIG. 1 is of a type which has the discharge oulet or slit 1b at the lower portion of the front wall 1B thereof and employs a leader for the film unit as detailed in FIG. 7 of the above U.S. patent application Ser. No. 527,779. In the embodiment of FIG. 1, the film pack 1 of generally rectangular box-like configuration is preferably made of plastic material or the like, and includes a container having the front wall 1B in which the discharge outlet 1b for the film units is formed at the lower portion thereof, side walls 1C, a rear wall, a bottom wall and an exposure opening 1a defined by a frame 1A. On each of the opposite side walls 1C, in positions adjacent to the edges g where the front wall 1B meets the side walls 1C, there is formed a projection 2 of a dovetail configuration elongated in a direction parallel to the edge g.

Figure 2:
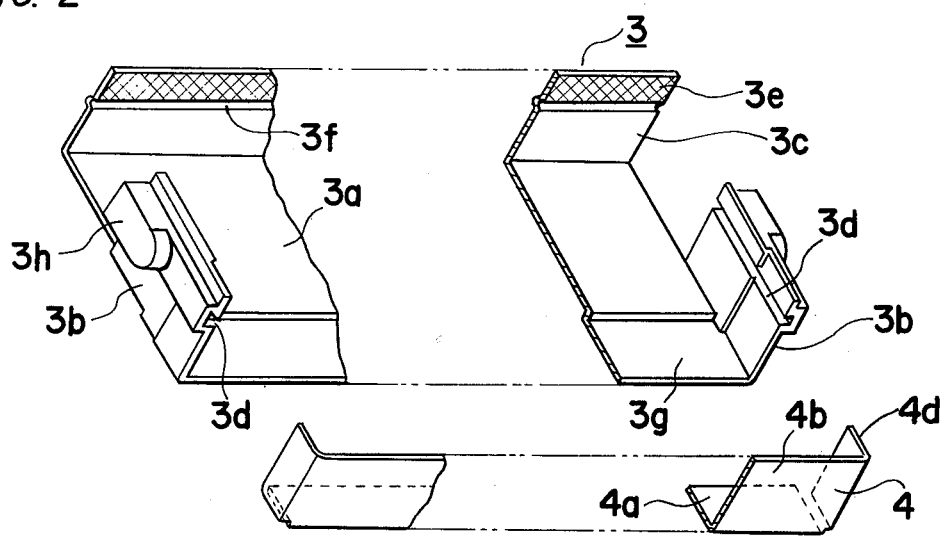
FIG. 2 is a perspective, exploded view showing, on an enlarged scale partially broken away, a preferred embodiment of a light shielding stopper member and a light shielding plate member according to the present invention.
Figure 3:
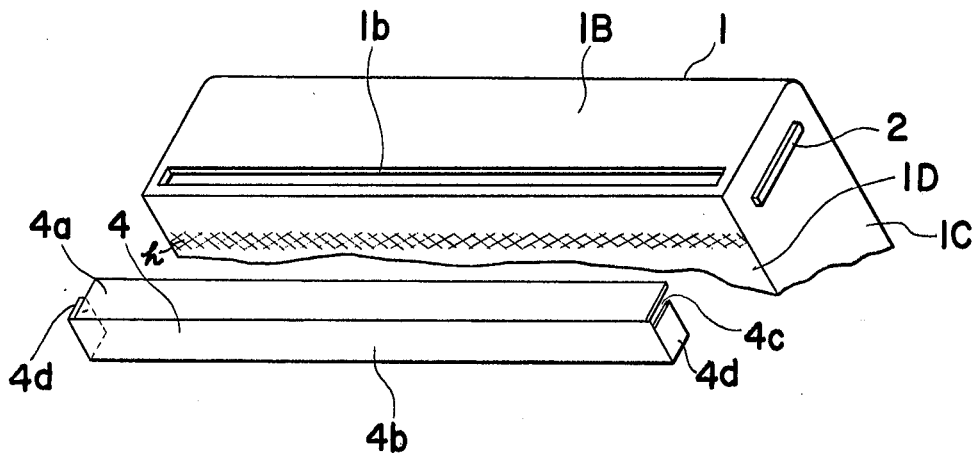
FIG. 3 is a perspective, exploded view showing, on an enlarged scale partially broken away, a discharge outlet portion of the film pack of FIG. 1 and the light shielding plate member of FIG. 2.

Referring now to FIGS. 2 and 3, a light shielding and stopper member 3 of the invention is integrally molded or formed by a material having a light shielding property and also a suitable flexibility, for example, by plastics, and includes a main portion 3a of rectangular shape which closely contacts the surface 1B of the film pack 1, almost entirely covering the surface 1B, side plates 3b each extending upwardly at right angles from each of the short side edges of the main portion 3a and a securing plate 3c which also extends upwardly at right angles from one long edge of the main portion 3a. On the inner surface of each of the side plates 3b, there is formed a dovetail groove 3d which engages the projection 2 formed on each of the side walls 1C of the film unit 1, by which arrangement, the light shielding and stopper member 3 is guided along the pair of projections 2 for displacement. A hatched portion 3e adjacent to one edge of the securing plate 3c is to be fixed to a similarly hatched portion 1d on the frame 1A of the film pack 1, for example, by high-frequency gluing. In the central portion of the securing plate 3c, there is formed a line of flection 3f extending across the width of the plate 3c in a direction parallel to said one edge of the securing plate 3C, so that, when the member 3 attached to the film pack 1 with the hatched portion 3e thereof fixed to the hatched portion 1d of the film pack 1 is displaced, being guided by the projections 2, the securing plate 3c is bent upwardly at the flection line 3f for smooth movement of the member 3. Close to the other long side edge of the main portion 3a, remote from the securing plate 3c, the main portion 3a is formed with a narrow stepped portion 3g which extends across the width of the main portion 3a in a direction parallel to the long side edge of the main portion 3a and which surface is lower than the inner surface of the main portion 3a approximately by the thickness of a light shielding plate member 4 mentioned hereinafter for holding a light shielding surface 4a of the member 4 between the surface 1B of the film pack 1 and the stepped portion 3g of the stopper member 3.

The shielding plate member 4 of the invention is integrally molded or formed by a material with a light shielding property and flexibility, for example, plastic material similar to that employed for the light shielding and stopper member 3 and includes a rectangular base portion 4b extending the width of the stopper member 3 and having opposite ends bent at right angles to the surface of the portion 4b to form a pair of short projections 4d for holding the film pack 1 therebetween, and further includes a light shielding portion 4a extending upwardly at right angles from one long side edge of the base portion 4b. It should be noted here that a notch 4c is formed at each of the edges where the base portion 4b and the projections 4d meet for enabling the shielding portion 4a of the flexible or resilient material to freely bend for allowing the film unit to pass therethrough, and to return to its original position after the passage of the film unit. The base portion 4b of the shielding plate member 4 is fixed by, for example, high frequency gluing, to a hatched portion h on the back surface 1D of the film pack 1 adjacent to the discharge outlet 1b, thus the shielding portion 4a of the member 4 shields the oulet 1b against any outside light.

Figure 4:
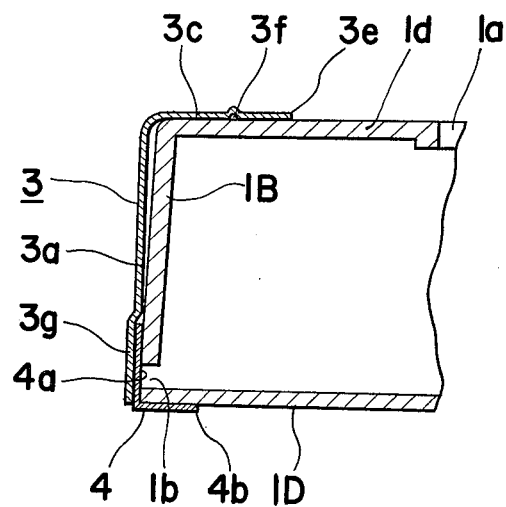
FIG. 4 is a cross sectional view showing, on an enlarged scale, the discharge outlet portion of the film pack of FIG. 1 with the light shielding stopper member and the light shielding plate member of FIG. 2 mounted thereon.

Referring also to FIG. 4, in the state where the light shielding and stopper member 3 and the light shielding plate member 4 are fixed to the film pack 1 in the above described manner, the light shielding portion 4a of the member 4 is not secured to the surface 1B of the pack 1, but is pressed against the outlet 1b of the surface 1B, being held between the stepped portion 3g of the member 3 and the surface 1B of the film pack 1, by which arrangement, the discharge outlet 1b of the film pack 1 is doubly shielded against light by the main portion 3a of the stopper member 3 and the shielding portion 4a of the shielding plate member 4.

For pressing the stopper member 3 against the shielding plate member 4 more perfectly, the surface 1B of the film pack 1 may be slightly, outwardly and downwardly inclined as shown in FIG. 4, by which arrangement, a kind of clamping force produced between the pair of dovetail projections 2 of the the film pack 1 and the main portion 3a of the stopper member 3 is exerted on the shielding portion 4a of the member 4.

Figure 5:
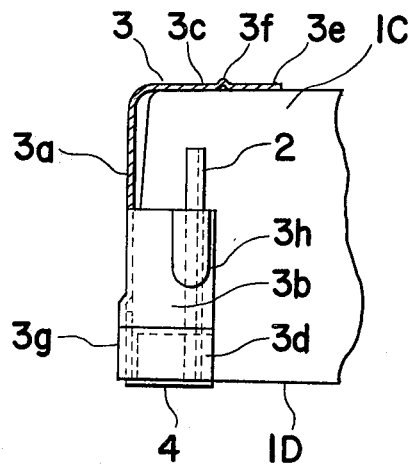
FIG. 5 is a similar view to FIG. 4, but particularly shows arrangement of a dovetail projection and a corresponding dovetail groove for displacement of the light shielding stopper member of FIG. 2.

Referring to FIGS. 2 and 5, on the outer surface of each of the side plates 3b of the stopper member 3, there is provided a projection 3h in a direction parallel to the dovetail groove which guides the stopper member 3 along the surfaces of the opposite side walls 1C of the film pack 1, which projections 3h are adapted to engage a releasing member (not shown), for example, a lever or the like (not shown) preferably provided on the rear cover plate or the body of the camera for readily releasing or raising the stopper member 3, by which arrangement, when the light shielding and stopper member 3 of the film pack 1 loaded in the camera is to be opened, the pair of projections 3h on the opposite side plates 3b of the stopper member 3 are pressed upward at the lower portions thereof upon engagement with the releasing member (not shown) suitably actuated from the outside of the camera with the dovetail grooves 3d of the side plates 3b of the member 3 being guided along the dovetail projections 2 formed on the film pack 1, and thus the main portion 3a of the stopper member 3 is displaced upward, sliding over the surface 1B of the film pack 1, which surface 1B is formed with the discharge outlet 1b therein. The displacement of the stopper member 3 in the above described manner consequently releases the light shielding plate member 4, and the light shielding portion 4a of the shielding member 4 is bent to an open position when pressed against the leading edge of the film unit as the film unit is discharged out of the outlet 1b of the film pack 1, while the same portion 4a is returned to its original position, by the own resilience thereof, to close and shield the outlet 1b against light after the trailing edge of the film unit has passed therethrough.

As is clear from the foregoing description, the light shielding means of the invention includes the pair of guide means provided on the side walls of the film pack, with the surface of the film pack which is formed with the discharge outlet being located between the side walls, so that the light shielding and stopper member for shielding and closing the discharge outlet can be guided along the guide means. After the film pack has been loaded in the camera and shielded against any outside light, the light shielding and stopper member is displaced along the guide means for releasing the former through actuation of the releasing means from outside of the camera. Since the light shielding means of the invention is mounted on the film pack with the former engaged with the pair of guide means which is provided on the film pack, not only is construction thereof rigid without possibilities of breakage or falling off the film pack, but careless actuation thereof during handling is advantageously prevented.

Furthermore, since each of the light shielding and stopper member and the light shielding plate member of the invention can be integrally molded from the materials such as plastics, manufacturing cost thereof is reduced to a large extent.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A film pack for use in association with a camera employing film in the form of individual film units which comprises:

a container of rectangular box-like configuration having a front wall formed with at least one slit-like opening forming a discharge outlet for discharging exposed film unit therethrough, side walls, a rear wall, a bottom wall and an exposure opening defined by a frame member, said side walls being provided thereon first guide means in position adjacent to edges where said front wall meets said side walls, light shielding means provided on said container, said light shielding means including a light shielding and stopper member of resilient material which extends across the width of said front wall of said container for completely shielding said discharge outlet, said light shielding and stopper member including a main portion in contact with said container front wall and slidable thereon, said light shielding and stopper member being provided with second guide means as integral opposite portions thereof for slidably engaging said first guide means so as to permit said main portion to be slidably guided by said first guide means between a lower position for shielding said discharge outlet and an upper raised position for terminating shielding of said discharge outlet, said light shielding and stopper member being provided with means adapted to engage releasing means to be thereby actuated from outside of the camera for displacing the former so as to terminate the shielding of said discharge outlet after said film pack has been loaded within the camera, said light shielding means further including a unitary light shielding plate member of resilient material of L-shaped cross section having one portion fixed to the bottom wall of said container and the other portion extending upwardly and resiliently pressed towards the front wall and partially overlapping the main portion of said light shileding and stopper member when said light shielding and stopper member is in its lower position to form a two layer resiliently displaceable light shield for said discharge outlet.

2. A film pack as claimed in claim 1, wherein said first portion of said light shielding plate member is held between said light shielding and stopper member and said front wall of said container when said light shielding and stopper member is at said lower position for doubly shielding said discharge outlet, said second portion of said shielding plate member being secured to said bottom wall of said container, said first portion of said shielding plate member being bendable, upon displacement of said light shielding and stopper member to said upper position, to an opened position when pressed by a leading edge of the film unit as the film unit is discharged out of said discharge outlet, and said first portion being self-resilient to return to its original outlet closed position by its own resilience to shield said discharge outlet after a trailing edge of the film unit has passed therethrough.

3. A film pack as claimed in claim 1, wherein said first guide means is a pair of dovetail projections formed, respectively on said walls of said container.

4. A film pack as claimed in claim 1, wherein said second guide means is a pair of dovetail grooves formed within opposite side portions of said light shielding and stopper member.

5. A film pack as claimed in claim 1, wherein said light shielding and stopper member is fixed, at an upper portion thereof, to a surface of said frame member of said container with a line of flection formed in said upper portion at a position adjacent to said fixed portion for smooth displacement of said light shielding and stopper member between said lower position and said upper position.

* * * * *